United States Patent [19]
Smith et al.

[11] Patent Number: 6,122,362
[45] Date of Patent: Sep. 19, 2000

[54] SYSTEMS AND METHOD FOR PROVIDING NETWORK ELEMENT MANAGEMENT FUNCTIONALITY FOR MANAGING AND PROVISIONING NETWORK ELEMENTS ASSOCIATED WITH NUMBER PORTABILITY

[75] Inventors: John G. Smith, Golden; Bret A. Godwin, Lakewood; David P. Taylor; Martha S. Langion, both of Littleton; Joe McGlynn, Highlands Ranch; Deborah Wilson-Hooker; Tim Drummond, both of Lakewood; Hardges Sessions, Aurora, all of Colo.

[73] Assignee: Evolving Systems, Inc., Englewood, Colo.

[21] Appl. No.: 08/907,323

[22] Filed: Aug. 6, 1997

(Under 37 CFR 1.47)

Related U.S. Application Data

[60] Provisional application No. 60/033,421, Dec. 24, 1996.

[51] Int. Cl.[7] ..................................... H04M 7/00
[52] U.S. Cl. ........................ 379/230; 379/207; 379/220
[58] Field of Search .................................. 379/201, 207, 379/210, 211, 212, 220, 229, 230

[56] References Cited

U.S. PATENT DOCUMENTS

| | | |
|---|---|---|
| 4,754,479 | 6/1988 | Bicknell .................................. 379/207 |
| 5,210,868 | 5/1993 | Shimada et al. ........................ 395/600 |
| 5,481,603 | 1/1996 | Gutierrez et al. ....................... 379/221 |
| 5,491,742 | 2/1996 | Harper et al. ........................... 379/201 |
| 5,546,452 | 8/1996 | Andrews et al. ....................... 379/219 |
| 5,572,643 | 11/1996 | Judson .................................. 395/793 |
| 5,583,929 | 12/1996 | Ardon .................................... 379/230 |
| 5,598,464 | 1/1997 | Hess ....................................... 379/213 |
| 5,625,681 | 4/1997 | Butler, II ................................ 379/207 |
| 5,661,792 | 8/1997 | Akinpelu et al. ....................... 379/221 |
| 5,689,555 | 11/1997 | Sonnenberg ........................... 379/220 |
| 5,867,570 | 2/1999 | Bargout et al. ........................ 379/207 |
| 5,881,145 | 3/1999 | Giuhat et al. .......................... 379/207 |
| 5,894,574 | 4/1999 | Whited ................................... 395/707 |
| 5,949,865 | 9/1999 | Fusinato ................................. 379/207 |
| 5,966,435 | 10/1999 | Pino ....................................... 379/207 |

*Primary Examiner*—Creighton Smith
*Attorney, Agent, or Firm*—Townsend and Townsend and Crew LLP

[57] ABSTRACT

The invention provides exemplary systems and methods for provisioning network elements when providing local number portability services. In one exemplary method, local number portability subscription information which includes both ported global title translation data and location routing number data is entered into a single network element management system. Selective network elements which are in communication with the network element management system are then provisioned with the ported global translation data and the local routing number data based on logical network definitions stored in the network element management system.

25 Claims, 3 Drawing Sheets

SYSTEMS AND METHOD FOR PROVIDING NETWORK ELEMENT MANAGEMENT FUNCTIONALITY FOR MANAGING AND PROVISIONING NETWORK ELEMENTS ASSOCIATED WITH NUMBER PORTABILITY

CROSS-REFERENCE TO RELATED APPLICATIONS

This application claims benefit from U.S. Provisional patent application Ser. No. 60/033,421, filed Dec. 24, 1996, the complete disclosure of which is herein incorporated by reference.

BACKGROUND OF THE INVENTION

The present invention relates generally to the field of telecommunications, and more specifically to the management of call processing information. In a specific aspect, the invention provides systems and methods which facilitate the ability to port a telephone number from one local carrier to another carrier.

Until recently, most regions in the United States have been serviced by a single local telephone service provider. For example, in the Inter-Mountain Region, local telephone service was only provided by U S West Communications. In an effort to provide competition in the local service provider market, Congress passed the Telecommunications Act of 1996. As part of this act, all companies are provided with the opportunity to compete in the local telephone service market.

To many individuals and businesses, a telephone number is an important asset. Indeed, studies have shown that a significant number of people and businesses would be hesitant or unwilling to change their local service provider if they were not allowed to keep their same telephone number. To address this problem, the FCC promulgated regulations under the Telecommunications Act to allow customers to port their same telephone number to a new carrier, referred to as Local Number Portability ("LNP"). Under the regulations, each carrier must provide supporting LNP systems which allow customers to order a change in carriers (order mediation) and to service the order to change the carrier (service mediation) within a specific time frame.

As part of the Telecommunications Act, a Number Portability Administration Center ("NPAC") has been chartered and includes a Service Management System ("SMS") which performs the mediation between two carriers when a number is to be ported. More specifically, when a number is to be ported the SMS receives a request from the carrier that is requesting to have the number ported to the carrier. This carrier is referred to as the "new carrier." The carrier that was in possession of the number to be ported is referred to as the "old carrier." It is the responsibility of the NPAC to ensure that both carriers have specified the correct information for the port to occur. If all the information is in order, the new carrier will be notified by the SMS and will then be responsible for activating the ported number.

Under the FCC regulations, each carrier must therefore have the capability to initiate, modify, and provide concurrence for service orders for consumers and businesses who wish to change local service providers and keep their current phone number. Carriers must coordinate these LNP orders (or subscriptions) with the NPAC. Once LNP subscriptions are approved by the NPAC, the capability must exist for these subscription changes/updates to be distributed to the appropriate network elements so that proper service can be provisioned.

Hence, it is an object of the present invention to provide systems and methods for managing call processing information, and in particular for facilitating local number portability when requested by an individual or business. In one particular aspect, it is an object of the invention to provide a system and method for provisioning network elements through an interface to a local service management system. Preferably, such an interface which will capture LNP subscription data from the local service management system and then provision multiple network elements. Further, such an interface will preferably be able to provision across network elements of different types and across different vendor platforms. It would also be desirable if such an interface were able to manage and configure the network elements. Other advantages and features of the invention will be described in greater detail hereinafter.

SUMMARY OF THE INVENTION

The invention provides systems and methods which enhance the ability of a telecommunications system to manage call processing information. Although useful in many telecommunications systems, the invention will find its greatest use when providing local number portability services.

In one exemplary embodiment, the invention provides a method for provisioning network elements when providing local number portability (LNP) services. According to the method, LNP subscription information which includes both ported global title translation (GTT) data and location routing number (LRN) data is entered into a single network element management system. Default GTT data may also be entered into the system. Selective network elements which are in communication with the network element management system are then provisioned with the ported GTT data and the LRN data based on logical network definitions stored in the network element management system. In this way, a single network element management system may be provided to directly provision both GTT and LRN data on selective network elements.

Preferably, the logical network definitions will be employed to identify specific network elements which are to be provisioned with the LRN and GTT data. A variety of network elements may be provisioned with LRN or GTT data including service control points (SCP), signalling transfer points (STP), intelligent peripherals (IP), service switching points (SSP), and the like. Typically, the logical network definitions define a specific network architecture defining how the LRN and GTT data is provisioned on the network and will identify particular network elements which are to be provisioned with the LRN and GTT data. As one example, SCPs may be provisioned with the LRN data and STPs may be provisioned with the ported GTT data. However, other schemes are possible. In this way, the network element management system is able to receive subscription information and then directly provision the appropriate network elements with the appropriate subscription information.

In one particularly preferable aspect, the network element management system is in communication with one or more local service management systems which supplies the network element management system with subscription provisioning messages. In this way, the network element management system serves as an interface to the network elements. In another aspect of the method, default GTT data may be entered into the network element management system through a graphical user interface. The network management system is then able to provision selective network elements with the default GTT data based on default routing information for non-ported numbers that is stored within the network element management system.

In another exemplary aspect, the ported GTT data comprises routing information for various GTT databases. Such databases can include, for example, databases related to a subscriber's interswitch voice messaging services (ISVM), CNAM services, CLASS services, LIDB services and the like.

In another embodiment, the invention provides an exemplary component for use with a local number portability system. The component comprises a network element management system having a central database which includes default GTT data and LNP subscription information, including both ported GTT data and LRN data. Preferably, the subscription information will be stored for a tunable time period. In this way, a scheme is provided to allow for the recreation of the information that was provisioned on a network element, the splitting of data on one or more network elements, the auditing of a network element, and the like. The component further includes code to selectively update specific network elements of different types in the LNP system with the ported GTT data, LRN data, and the default GTT data.

Preferably, the network elements comprise SCPs and STPs, although other network elements may be used. In this way, a single component may be used to provision both SCPs and STPs with LNP subscription information. In another aspect, the network element management system is adapted to be placed in communication with a local service management system which supplies the network element management system with subscription provisioning messages. A graphical user interface may also be provided to provision subscription information, the default GTT data, and LRN data on a single logical element or an arbitrary set of network elements (selectable from the graphical user interface). Further, the graphical user interface may also be employed to query data on the network elements.

The invention further provides another exemplary component for use with a local number portability system. The component comprises a network element management system having a central database which at least temporarily stores LNP requests along with associated subscription information. The network element management system further includes an interface which is adapted to interface the central database with various network elements. Further, the interface includes an open distributed computing environment functionality. In this way, a standard interface is provided to allow network element providers to easily interface with the network element management system. Optionally, specialized interfaces may be developed to provide connectivity from the network element management system to network elements that do not support the standard interface.

In still a further embodiment, the invention provides an exemplary method for facilitating the provisioning of local number portability subscription data on network elements. According to the method, a network element management system is provided which is adapted to be placed between a local service management system and various network elements. The network element system is provided with a database for at least temporarily storing local number portability requests along with associated subscription data received from the local service management system. Access to the data in the database and in the network elements is provided through a graphical user interface. In this way, various types of subscription data may be accessed both in the network element management system and in the network elements through the graphical interface.

In one aspect, local number portability subscription data is provisioned on the network elements directly from the graphical user interface. In another aspect, a summary of various activities performed by the network element management system may be viewed through the graphical interface. In still a further aspect, security information for the network element management system may be modified through the graphical user interface. The graphical user interface may also be employed to manage configuration parameters for the network management system as well as to modify the default GTT information on the network elements. Preferably, the graphical user interface will employ standard HTTP/HTML browser technology.

The invention provides another exemplary method for providing local number portability services. The method comprises providing a network element management system having a database which includes subscription data. Further, at least some of the subscription data comprises LRN and GTT data. In the method, the LRN and GTT data are split across multiple network elements which are in communication with the network element management system. For example, any of the subscription data, just the LRN data, or just the GTT data may be submitted to any type of network element that is identified as supporting a provisioning interface for that kind of data, all by a single network element management system. Optionally, the LRN and GTT data may be entered via a graphical user interface which is in communication with the network element management system.

DETAILED DESCRIPTION OF THE SPECIFIC EMBODIMENTS

Figure 1:
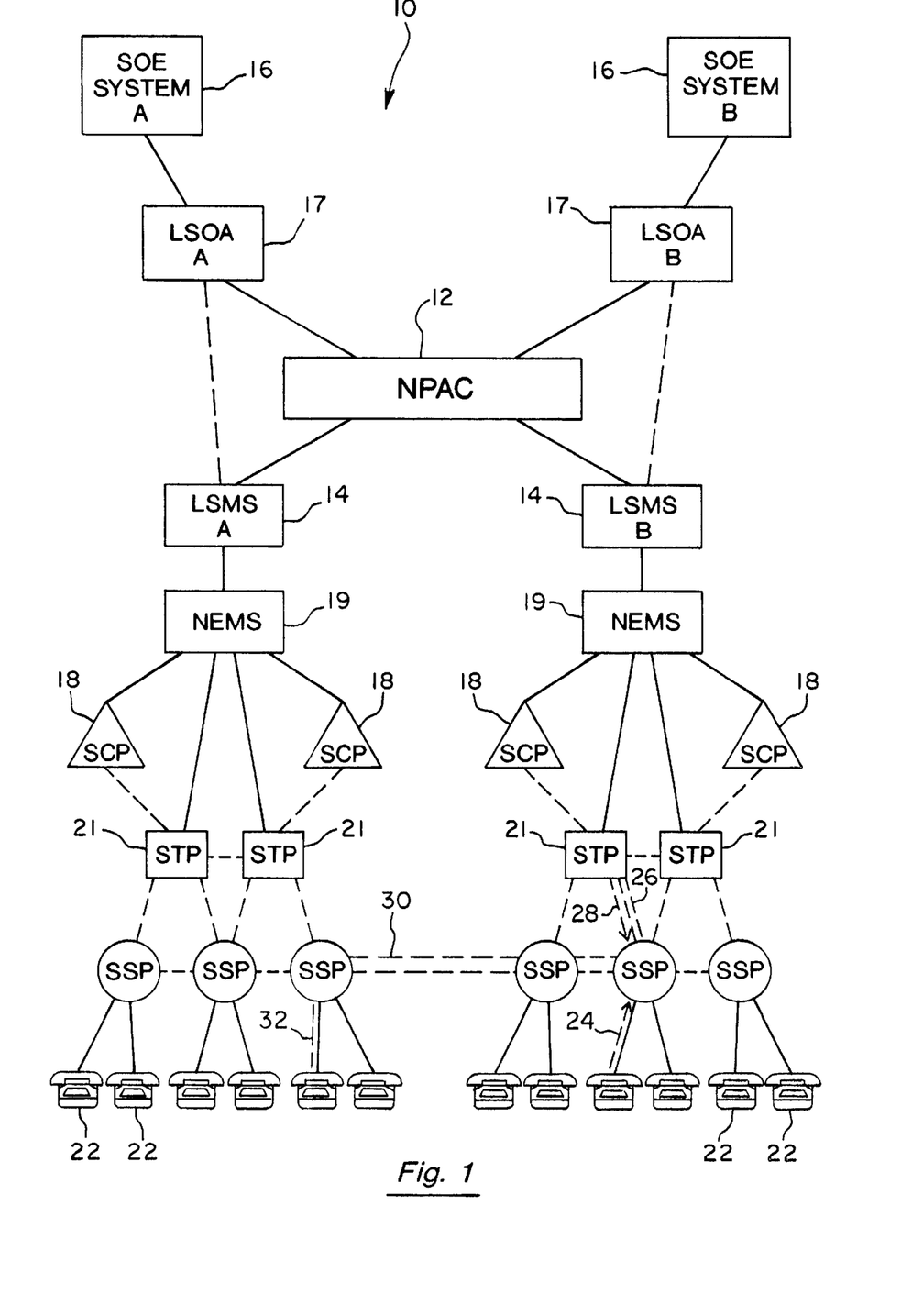
FIG. 1 illustrates an exemplary LNP system according to the present invention.

Referring now to FIG. 1, reference will be made to an LNP system 10. Central to system 10 is a Number Portability Administration Center ("NPAC") 12. NPAC 12 is in communication with a plurality of local telephone carriers, each having a Local Service Management System ("LSMS") 14 (with only two being shown for convenience of illustration). NPAC 12 includes a Service Management System ("SMS") which performs mediation between two of the telephone carriers when a telephone number is to be ported.

System 12 further includes a plurality of Service Order Entry ("SOE") systems 16 which are provided for entering certain information into NPAC 12. Exemplary LSMS and SOE systems are described in copending U.S. Application Ser. No. 08/906,757, (attorney docket no. 17349-1-1), filed on the same day as the present application, the complete disclosure of which is herein incorporated by reference. Mediation between SOE systems 16 and NAPC 12 is accomplished by providing Local Service Order Administration ("LSOA") systems 17 which function as an interface to allow number porting requests to be sent to NPAC 12 from each SOE system 16. In some cases, the LSOAs 17 may be configured to handle the functions of the SOE systems 16 so that separate SOE systems 16 will not be required.

As shown, each LSMS 14 is in communication with an associated Network Element Management System ("NEMS") 19. However, any number of LSMSs may be in communication with any number of NEMSs. Each NEMS 19 is associated with appropriate network elements, such as Service Control Points ("SCP") 18 and Signalling Transfer Points ("STP") 21. SCPs 18 and/or STPs 21 contain information specific to each ported customer. For example, each SCP 18 and/or STP 21 will preferably include telephone numbers ("TN"), location routing numbers ("LRN"), NPA-NXX numbers, global title translation numbers ("GTT"), and the like.

In communication with the SCPs 18 and STPs 21 are at least one Service Switch Point ("SSP") 20. SSPs 20 are the physical switching devices used to route calls to specific telephones 22. As shown in phantom line, SSPs 20 are all in communication with each other to allow calls to be appropriately routed.

Still referring to FIG. 1, the process of porting a TN from one carrier to another carrier will be described. Initially, a customer will contact a new carrier to which the customer's TN will be ported and request a change, referred to as a subscription. Such contact with the customer will preferably be at the new carriers SOE system 16, e.g., SOE system B. The old carrier and the new carrier will then typically communicate the desired change to each other and send the subscription information to NPAC 12 for approval. The subscription information is sent from the old and new carrier's SOE systems 16 via their respective LSOAs 17. The request may include information including the TN to be ported, routing information, GTT information, and the like.

If all the information is in order, NPAC 12 will approve the subscription and send a change request to each LSMS 14. Each LSMS 14 logs the request and validates the request to ensure it contains correct information. If the request is valid, each LSMS 14 creates and stores the new subscription in a database.

After the subscription is created locally at the appropriate LSMS 14, each LSMS 14 sends a creation request to the associated NEMS 19 which in turn forwards the appropriate subscription information to the appropriate network elements, such as, for example, SCP 18 and/or STP 21. In turn, SCP 18 and/or STP 21 respond to the SSPs 20 and transfer call routing data based on the subscription data to the appropriate SSP 20 in response to a call to a ported number.

If unable to successfully complete the port, NEMS 19 will send a failure message to LSMS 14. Otherwise, a success message will be produced and sent to LSMS 14. In turn, LSMS 14 sends information to NPAC 12 indicating a successful port has occurred. NPAC 12 then updates its database and sends the updated information to the originating LSOA 17 so that their records can also be updated to show the number has been ported.

In this way, a customer may easily change their local carrier while still keeping their own TN by simply contacting a new carrier and requesting the change. Upon activation of the TN by a new carrier, each LSMS 14 will have its information updated so that every carrier will know who is servicing the ported number.

Once the port is completed, the routing of a call between two telephones 22 is as follows. Initially, a caller dials the called's TN (which has been ported). As indicated by arrow 24, the call goes to the associated SSP 20, i.e. the switch service by the calling party. SSP 20 is configured to recognize whether the NPA-NXX number is in a portable region. In the event that the region is not a portable region, SSP 20 routes the call to the called's telephone 22 using the NPA-NXX of the called's party TN.

In this example, however, the NXX number is in a portable region. Hence, SSP 20 queries the associated SCP 18 and/or STP 21 as to whether this number has in fact been ported (see arrow 26). SCP 18 and or STP 21 knows whether the number has been ported because each LSMS 14 is provided with information on each port by NPAC 12 as previously described. Hence, LSMS B has already transmitted information regarding the port to SCP 18 and/or STP 21 to activate the number. If the number has been ported, SCP 18 and/or STP 21 transmits call routing information to SSP 20 (see arrow 28) which in turn causes the call to be sent to the called's SSP 20 as indicated by arrow 30. The called's SSP 20 then routes the call to the appropriate telephone 22 as indicated by arrow 32.

Figure 2:
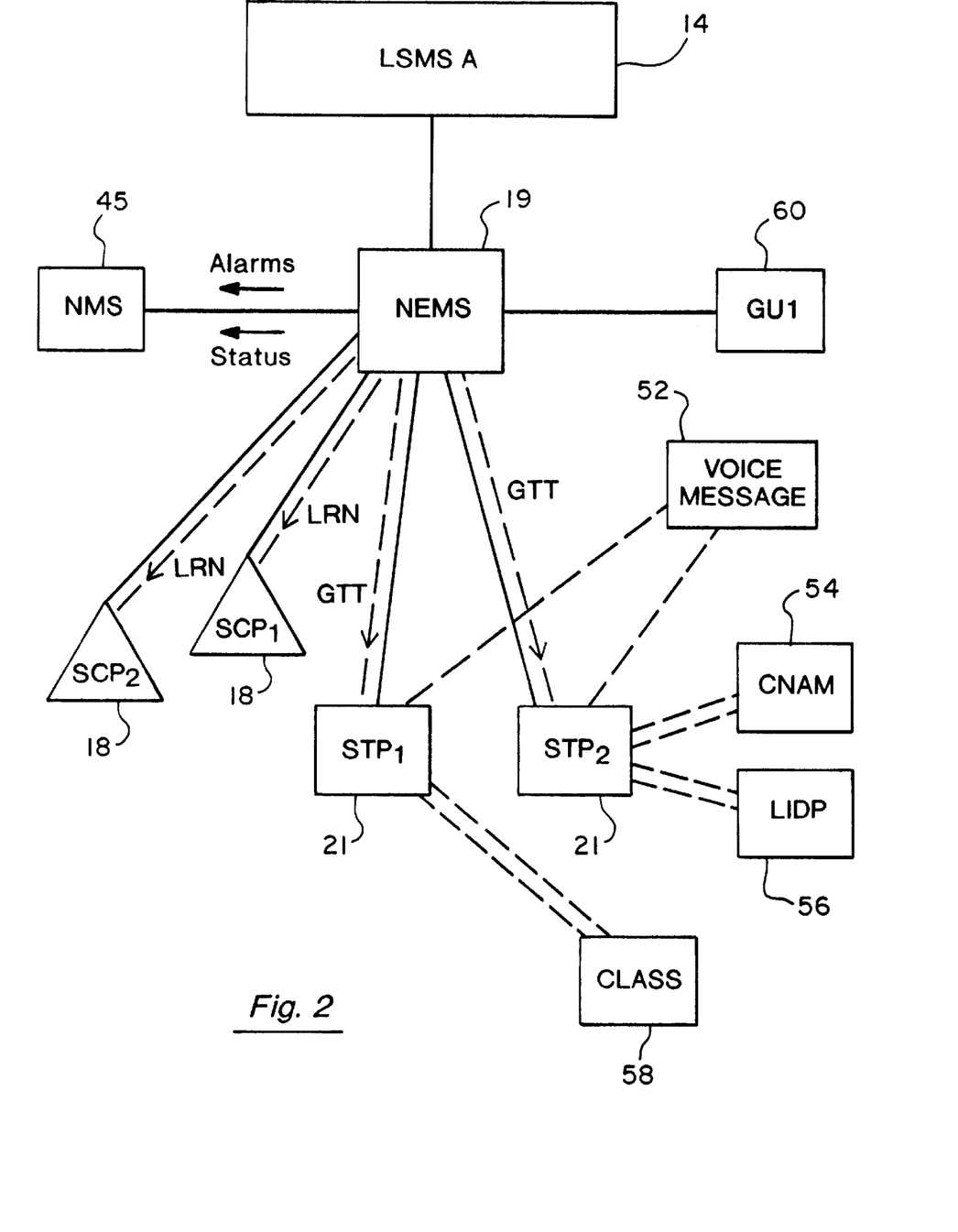
FIG. 2 illustrates a more detailed view of a network element management system of the LNP system of FIG. 1.

Referring now to FIG. 2, configuration and operation of NEMS 19 will be described in greater detail. Briefly, NEMS 19 is configured to receive subscription data from LSMS 14 and to provision SCPs 18 and/or STPs 21 (or other network elements) with the subscription data. Such provisioning messages may include, for example, messages to add a subscription, modify a subscription, delete a subscription, query a subscription, and the like. Preferably, a positive acknowledgement will be sent to LSMS 14 from NEMS 19, for each message received from the LSMS, to confirm that the message was in fact received. Once the action corresponding to that message is performed by NEMS 19, a return message is issued to LSMS 14 indicating success or failure. Further, where possible, each provisioning message sent to NEMS 19 from LSMS 14 is logged by NEMS 19. Where possible, any transmission errors between NEMS 19 and LSMS 14 are also logged by NEMS 19.

In addition to updating LSMS 14 with the subscription provisioning status, NEMS 19 also distributes subscription data to network elements based on a domain routing table which uses NPA-NXX as a selector as well as a service provider ID number. Further, NEMS 19 maintains and provides a present view of the provisioning process for each subscription across one or more network element mated pairs, such as $SCP_1$ and $SCP_2$. As described in greater detail hereinafter, another function of NEMS 19 is to split LRN and GTT data across multiple network elements, if required. Further, NEMS 19 is configured to store and download default GTT data to the network elements.

In summary, NEMS 19 is configured to accept LNP subscription provisioning requests from LSMS 14, store the provisioning request as activities that are tracked, break the provisioning request into provisioning commands and provide routing of the provisioning request to the proper network elements. Once the requested provisioning of subscription data has been performed, NEMS 19 returns a status indicator and a copy of any requested data to LSMS 14. Such a process is repeated for each request sent from LSMS 14.

NEMS is able to obtain query results from one or more network elements (depending on the particular routing table) and compare the results to ensure that all network elements that respond have the same data. The comparison function compares fields that are known to be stored on all network elements. Those that are not are instead compared to find the "best returned value" in order to return the single best result for the query operation.

Figure 3:
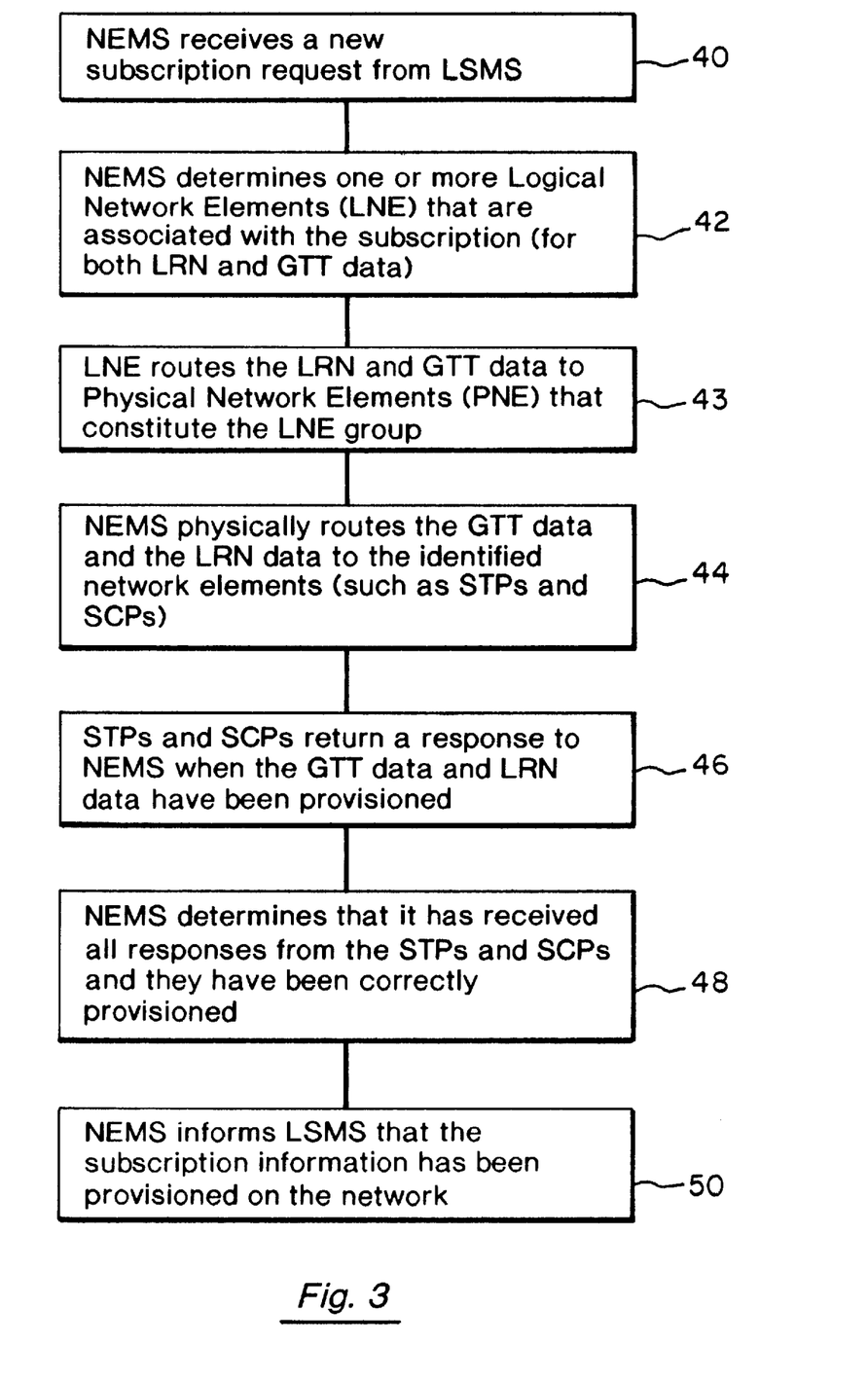
FIG. 3 is a flow chart setting forth an exemplary method for provisioning network elements according to the invention.

Referring now to FIG. 3, an exemplary method for provisioning the network elements with subscription information will be described. As indicated in step 40, NEMS 19 receives a new subscription request from LSMS 14. Alternatively, NEMS 19 may receive various other requests, such as requests to perform changes, deletions, queries and the like. However, for convenience of discussion, the method set forth in FIG. 3 will refer only to a request to add a new subscription. Upon receipt of the subscription request, the new subscription data is stored in a database within NEMS 19 during the provisioning process. As illustrated in step 42, NEMS 19 determines one or more Logical Network Elements (LNE) that are associated with the subscription for both LRN and GTT data. This is based on domain routing determined by the NPA-NXX and service provider ID (if necessary). As shown in step 43, the LNEs route the LRN and GTT data to physical network elements (PNE) that constitute the LNE group. As illustrated in step 44, NEMS 19 then physically routes the GTT data and the LRN data to specific network elements. One non-limiting example is for NEMS 19 to split LRN and GTT data so that the GTT data is routed to the identified STPs and the LRN data is routed to identified SCPs. The STPs and SCPs then return a response to NEMS 19 when the GTT data and LRN data have been provisioned as illustrated in step 46. NEMS 19 then determines that it has received all responses from the STPs and SCPs and that they have been correctly provisioned as set forth in step 48. As shown in step 50, NEMS 19 then informs LSMS 14 that the subscription information has been provisioned on the network. If all elements do not return the same data, NEMS 19 will return an out of synchronization error to LSMS 14. LSMS 14 will then have the opportunity of resending the information to NEMS 19 so that it may retry to correctly provision the network elements. During the process, NEMS 19 will preferably log all provisioning activities, log any error conditions and generate alarms for error conditions which are designated as alarmable in the configuration file. For example, as illustrated in FIG. 2, a network management station 45 (NMS) is in communication with NEMS 19 and receives system management data, such as alarms, system and interface status, and the like. The interface is over SNMP, which is an industry standard network management protocol.

Still referring to FIG. 2, configuration of NEMS 19 to provision network elements with subscription data will be described in greater detail. NEMS 19 preferably includes domain routing data that is used to route subscription data to network elements using NPA-NXX. Based on the telephone number in the subscription data being provisioned, NEMS 19 will identify the one more relevant logical network elements to which the relevant parts of the subscription data should be routed. In one specific example which is illustrated by the arrows in FIG. 2, NEMS 19 will then physically route the LRN data to $SCP_1$ and $SCP_2$, and the GTT data to $STP_1$ and $STP_2$. The SCPs and STPs may be provided in mated pairs, i.e., each will store identical information, so that a switch can communicate with either of the elements. (Splitting of the LRN and GTT data is advantageous in that such data may be separately stored on different types of network elements. As shown, the LRN data is stored on SCPs while the GTT data is stored on STPs.) Alternatively, only a single network element may be employed to store the data. The NEMS configuration GUIs allow this information to be provisioned on NEMS 19 so that when routing from a LNE to that LNE's PNE(s), the correct routing and assembly of results is performed.

The local number portability system will preferably further include a variety of databases to which the STPs 21 may communicate to access various types of GTT data. By way of illustration, STPs 21 may communicate with an interswitch voice messaging database (ISVM) 52, a CNAM database 54, a LIDB services database 56, and a CLASS database 58. CNAM database 54 provides various features such as calling name ID and ISVM. LIDB database 56 provides alternate billing services, such as NPA-NXX calling cards, 1-800 numbers and the like. CLASS database 58 provides customers with switch based services.

When a customer requests that their telephone number be ported, NEMS 19 provisions the appropriate STPs with ported GTT data. In this way, when a caller calls a ported number, the switch of the calling party will access one of STPs 21 to access the ported GTT routing information. For instance, if a user makes a call using a calling card having a ported NPA-NXX, the switch will access STP 21 in order to determine proper billing information. In turn, STP 21 will access the LIDB database 56 specified by the calling card to determine the appropriate information. The switch will then access SCP 18 to determine the local routing number in order to appropriately route the call (assuming the called party has a ported number) as previously described.

Another feature of NEMS 19 is that it is able to store default GTT data in its database. Preferably, the defaulted GTT data will be entered in NEMS 19 via a graphical user interface 60 (GUI). The default GTT data will be loaded or updated in all network elements that are configured to receive the default GTT data. In this way, the network elements will be provisioned with GTT data for non-ported numbers.

GUI 60 is preferably configured to provide two levels of user access. The first is an operator level to accommodate provisioning users who perform daily operations associated with the management of subscription provisioning activities. The other is the administrative level for users who perform security management and system configuration for the NEMS users. GUI 60 is preferably built using industry standard HTTP/HTML browser technology and may use the JAVA language to provide platform independent interaction with users. GUI 60 will also preferably include a security component using a Secure Sockets Layer (SSL) transport. Conveniently, GUI 60 may be executed from a Netscape navigator 3.0 or compatible JAVA-capable browser.

One particular advantage of GUI 60 is that it may be employed to allow a user to update or query LNP subscription data directly on a network element. With the GUI 60, the user simply selects add, modify, or delete options and updates the data. A query option is also available through GUI 60. In the event that the network element is configured in a mated pair configuration, the user is provided with the option to update both elements in the pair. GUI 60 also includes an activity manager which provides an interface to the user enabling them to view all activities that are presently active in the system or that have been processed within a configurable time period. Activities that have failed because of an error condition may be resubmitted from the activity manager.

GUI 60 further includes a security manager which administers user logon privileges and access rights. Preferably, only the security administrator may update the security information. The security manager is preferably configured to add users, delete users, modify users, query users, assign access rights to a user and the like.

One primary use of GUI 60 is to manage the system configuration parameters. The configuration editor is provided with windows that enable a user to change the system parameters for various system components including domain routing table, network element configuration, NEMS application parameters and the like. As previously described, a default GTT editor is also provided by GUI 60 to allow for modifications of default GTT information that need to be updated on network elements for non-ported numbers. Such data may be added, changed or deleted. A user may also query default GTT information and request that this query operation be performed only on the local (database) copy of the GTT data, or on the network elements. GUI 60 further provides an option to allow users to scan log files for specific information about specific activities and data elements. Such log files that may be viewed include an activity log, an error log and the like.

Through GUI 60, a series of reports may be generated regarding the status of NEMS 19. Such reports may be sent to a printer, a file, a user's email address, or may be viewed from the screen. Some of the reports, such as ad hoc reports, are preferably created and executed using the Oracle Report Writer product. The Oracle Report Writer is executed from an X-windows interface to the NEMS system. Other predefined reports may also be created which are accessed through GUI screens that allow the user to specify selection criteria for that report. For example, an LNE report is provided which allows the user to specify "all" or "matching domain". Also, reports can be sent to a printer, file, screen, email, or fax.

Another feature of NEMS 19 is its ability to manage provisioning subscription failures. In the event of a provisioning failure, NEMS 19 may be employed to resubmit the provisioning request. Preferably, this command is used after an operator has analyzed the problem with the network element, has fixed the network element and is ready to attempt the provisioning activity again. Other potential problems may include difficulties with the NEMS configuration data. For example, if there is no route for the NPA-NXX in a request, it will fail. Such a problem may be fixed by correcting the routing table. NEMS 19 also includes a cancel provisioning command which is used to stop the provisioning of subscription data and to send a message back to LSMS 14 indicating that the subscription data was not provisioned properly. Further, a "forced success" option is provided to allow the user to change the status of a failed operation to success. For example, such as when a failure return from the PNE can actually be ignored, such as a "duplicate record" error when adding a new subscription.

NEMS 19 is further configured to manage various activities. Such activities are intended to include discrete work that takes place in the system, such as a provisioning request to add a subscription. NEMS 19 provides a system activity manager for a user to view and manipulate such activities. NEMS 19 assigns and updates the status of each activity as it proceeds in the provisioning process. Such activities can include, for example, the addition of subscription data, the modification of subscription data, the deletion of subscription data, the querying of subscription data, adding default GTT data, modifying default GTT data, deleting default GTT, querying default GTT data and the like.

In another aspect, NEMS 19 is configured to log various application errors. Such errors may include, for example, data validation errors, such as invalid LRN and NPA-NXX, data inconsistencies, such as invalid TN format, provisioning errors related to the provisioning of network elements and the like. Preferably, every error on the system will be logged. A user may then use the activity manager to scan for activities to determine their status. Reports may also be printed that contain the activity status.

NEMS 19 is further configured to respond to audit queries from LSMS 14. NEMS 19 returns a single instance of the subscription data associated with the respective network elements where the data is provisioned. If the data is provisioned on multiple network elements or mated pairs and the data is not consistent across all elements, NEMS 19 will return an out of synchronization error to LSMS 14.

One particular advantage of NEMS 19 is that it may be configured to support both standard and specialized element interfaces to provision local number portability network elements. The standard interface used by NEMS 19 will preferably be constructed using Distributed Computing Environment Remote Procedure Calls (DCE RPC). Such an interface is employed to provide a standard interface for network element providers to interface with NEMS 19. Preferably, such an interface will provide the following messages based on whether the LRN and GTT functionality is co-resident in the same network element.

| Co-Resident | Non-co-resident |
| --- | --- |
| Add, Modify, Delete, Query, subscription LRN/GTT data | Add, Modify, Delete, Query subscription LRN data |
| Add, Modify, Delete, Query, default GTT data | Add, Modify, Delete, Query subscription GTT data |
| | Add, Modify, Delete, Query default GTT data |

Specialized network element interfaces may also be provided for NEMS 19 to provide connectivity from NEMS 19 to network elements that do not support the standard interface. Other specialized interfaces may be provided to external systems for provisioning and/or data distribution.

Information about various network elements that are connected to NEMS 19 will preferably be stored in the NEMS database. Such information represents the provisioning options available for each element and whether two or more elements are logically associated to receive similar provisioning data. NEMS 19 contains domain routing information that is used to route subscription and default GTT data to the network elements. This information comprises an NPA-NXX and the associated network elements that should receive the subscription and default GTT data related to the NPA-NXX. The LNE definition also includes the "service type"which identifies what aspects of LNP data goes to the members of that LNE. For example, "ALL" identifies that the complete subscription record and default GTT goes to the LNE. As another example, "GTT" indicates that only the GTT and default GTT goes to the LNE. NEMS 19 preferably further includes a SNMP agent and a Management Information Base (MIB) to supply system alarms to a network management monitoring workstation. Such alarms that may be generated include, reachable failure to LSMS, network element reachable failure, logical pair of network elements out of synchronization and the like.

NEMS 19 is configured to support a variety of data elements including subscription data, network data elements, domain routing data, default GTT data and the like. Such data may be stored in a wide variety of relational databases from a variety of commercial vendors, such as Oracle. The data may be retrieved using GUI 60 or by using appropriate report writer tools.

All subscription data that is downloaded from LSMS 14 will preferably be stored in the NEMS 19 database for the duration of the provisioning activity to the network elements. Once all provisioning has been completed, the data is preferably removed from the database. All subscription data is preferably written to a history log table after the provisioning process is complete. This data may then be used to verify that the subscription data was received and processed by NEMS 19. The history log file may be viewed from GUI 60. The data elements related to domain routing (that are stored in the database) represent the information needed to successfully route incoming subscription data updates to the proper network elements. The domain routing table may be used to route subscription data to network elements using NPA-NXX. The data elements associated with default GTT data are provisioned on a network element to provide default routing for CLASS, ISVM, and services associated with non-ported numbers in an NPA-NXX. As previously mentioned, NEMS 19 provides a clean-up process that removes subscription data from the database when the provisioning activities for a subscription are completed. However, in some cases a mirror of the data may be kept as long as needed.

Another feature of NEMS 19 is that it is designed to be scaleable to meet initial and future LNP requirements for LSMS functionality. In a preferred embodiment, NEMS 19 includes at least eight network element interfaces, each having a throughput of at least 15 subscriptions per second. NEMS 19 will preferably further include at least one network management interface capable of handling at least one SNMP request per second. It will be appreciated that the transaction rate to the network elements is dependent on the number of interfaces and the number of simultaneous provisioning activities. Performance is also related to the hardware configuration and other software operating on the same box as NEMS 19. NEMS 19 preferably maintains subscription data during the provisioning process only. The fixed disk space is preferably sized for configuration data, log files and transient subscription data. In one exemplary embodiment, NEMS 19 will be able to support at least 20 simultaneous GUI users.

The system of the invention is capable of operating using a wide variety of hardware. As one non-limiting example, NEMS 19 may operate on a HP-9000 class enterprise server using a PA-8000 64 bit RISC processor. All memory, disk, and archival devices may be supported by HP-UX 10.2 and the HP-9000 architecture. One type of operating system for the application software will preferably be HP-UX version 10.20 or later. The required storage capacity for NEMS 19 will be based on a variety of factors including subscription transient activity (churn), log file size, configuration data and the like.

NEMS 19 may also be configured to support high availability as an additional option to the base product configuration. In a high availability configuration, the software will preferably support automatic switch-over from a primary system to a warm spare, thereby minimizing application down time.

As previously described, NEMS 19 is configured to provide a variety of reports, including configuration reports, domain table reports, system measurement reports, user reports, security log reports, transaction reports, error reports and the like. For example, the domain report may contain a list of the NPA-NXXs, LRNs, and the network elements that are associated with each. The system measurement reports may include information relating to the number of provisioning transactions that have occurred during a configurable time period.

The invention has now been described in detail. However, it will be appreciated that certain changes and modifications may be made. Therefore, the scope and content of this invention are not limited by the foregoing description. Rather, the scope and content are to be defined by the following claims.

What is claimed is:

1. A method for provisioning network elements when providing local number portability services, the method comprising:
    entering local number portability subscription information which includes ported global title translation data and location routing number data into a single network element management system; and
    provisioning selective network elements which are in communication with the network element management system with the ported global title translation data and the location routing number data based on logical network definitions stored in the network element management system.

2. A method as in claim 1, wherein the network elements being provisioned are selected from the group of network elements consisting of SCPs, STPs, IPs and SSPs.

3. A method as in claim 1, wherein the network element management system is in communication with at least one local service management system which supplies the network element management system with subscription provisioning messages.

4. A method as in claim 1, further comprising entering default global title translation data into the network element management system through a graphical user interface; and provisioning selective network elements which are in communication with the network element management system with the default global title translation data based on default routing information for non-ported numbers.

5. A method as in claim 1, wherein the ported global title translation data comprises routing information for subscribers ISVM services, CNAM services, CLASS services, and LIDB services databases.

6. A component for use with a local number portability system, the component comprising:
    a network element management system having a central database which includes default global title translation data and local number portability subscription information including ported global title translation data and location routing number data; and
    code to selectively update specific network elements of different types in the local number portability system with the ported global title translation data, location routing number data, and default global title translation data.

7. A component as in claim 6, wherein the network elements are selected from the group of elements consisting of SCPs, STPs, IPs and SSPs.

8. A component as in claim 6, wherein the network element management system is adapted to be placed in communication with at least one local service management system which supplies the network element management system with subscription provisioning messages.

9. A component as in claim 6, further comprising a graphical user interface for entering the default global title translation data into the network element management system and for provisioning and querying data on the network elements.

10. A component as in claim 6, wherein the ported global title translation data comprises routing information for ported subscribers ISVM services, CNAM services, CLASS services, and LIDB services databases.

11. A component for use with a local number portability system, the component comprising:

a network element management system comprising a central database which at least temporarily stores local number portability subscription information, and an interface which is adapted to interface the central database with various network elements, wherein the interface includes an open distributed computing environment functionality; and wherein the central database is further adapted to be placed in communication with at least one local service management system to receive subscription provisioning messages.

12. A method for facilitating the provisioning of local number portability subscription data on network elements, the method comprising:

providing a network element management system which is adapted to be placed between a local service management system and various network elements, wherein the network element management system includes a database for at receiving local number portability subscription data received from the local service management system; and providing access to data in the database and in at least one network element through a graphical user interface.

13. A method as in claim 12, further comprising provisioning local number portability subscription data on the network elements from the graphical user interface.

14. A method as in claim 12, further comprising viewing a summary of various activities performed by the local service management system through the graphical user interface.

15. A method as in claim 12, further comprising modifying security information for the network element management system through the graphical user interface.

16. A method as in claim 12, further comprising managing configuration parameters for the network element management system through the graphical user interface.

17. A method as in claim 12, further comprising modifying default global title translation information for the network element management system through the graphical user interface.

18. A method as in claim 12, wherein the graphical user interface is operated employing a HTTP/HTML compatible browser.

19. A network element management system for use in a local number portability system, the network element management system comprising:

a database for receiving number portability subscription data, wherein the database is adapted to be placed between a local service management system and various network elements, wherein the database stores local number portability subscription data received from the local service management system; and a graphical user interface which provides user access to the database, wherein local number portability subscription data may be updated on at least one network element from the graphical user interface.

20. A system as in claim 19, wherein the graphical user interface is operable employing a HTTP/HTML compatible browser.

21. A method for providing local number portability services, comprising:

providing a network element management system having a database which includes subscription data, wherein at least some of the subscription data comprises LRN and GTT data;

splitting the LRN and GTT data across multiple network elements which are in communication with the network element management system.

22. A method as in claim 21, further comprising transmitting the LRN data to SCPs and the GTT data to STPs.

23. A method as in claim 21, further comprising provisioning the LRN and GTT data using a graphical user interface which is in communication with the network element management system.

24. A network element management system for use in a local number portability system, the network element management system comprising:

a database for at least temporarily storing local number portability subscription data including LRN and GTT data, wherein the database is adapted to be placed between a local service management system and various network elements; and means for splitting the LRN and GTT data across at least some of the network elements.

25. A system as in claim 24, further comprising a graphical user interface for provisioning the LRN and GTT data.

* * * * *